US008730298B2

(12) United States Patent
Gu et al.

(10) Patent No.: US 8,730,298 B2
(45) Date of Patent: May 20, 2014

(54) METHOD, DEVICE, TERMINAL AND SYSTEM FOR SWITCHING VIDEO RESOLUTION

(75) Inventors: Chenchen Gu, Shenzhen (CN); Jing Lv, Shenzhen (CN); Xuecheng Luo, Shenzhen (CN); Peizhao Li, Shenzhen (CN); Pu Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 116 days.

(21) Appl. No.: 13/547,752

(22) Filed: Jul. 12, 2012

(65) Prior Publication Data
US 2012/0281062 A1    Nov. 8, 2012

Related U.S. Application Data

(63) Continuation of application No. PCT/CN2011/070226, filed on Jan. 13, 2011.

(30) Foreign Application Priority Data

Jan. 21, 2010  (CN) .......................... 2010 1 0001654

(51) Int. Cl.
*H04N 7/14*    (2006.01)
(52) U.S. Cl.
CPC ...................................... *H04N 7/14* (2013.01)
USPC ................... 348/14.12; 348/14.01; 348/14.13
(58) Field of Classification Search
USPC ............. 348/14.01–14.16; 709/204; 370/232, 370/468
See application file for complete search history.

(56) References Cited

U.S. PATENT DOCUMENTS

| 6,014,694 | A | * | 1/2000 | Aharoni et al. ................ 709/219 |
| 7,382,396 | B2 | | 6/2008 | Ryu |
| 8,089,502 | B2 | * | 1/2012 | Krisbergh et al. ......... 348/14.01 |
| 8,405,702 | B1 | * | 3/2013 | Gottlieb ..................... 348/14.08 |
| 2002/0126751 | A1 | | 9/2002 | Scheurich et al. |
| 2005/0030369 | A1 | | 2/2005 | Ryu |
| 2005/0164679 | A1 | | 7/2005 | Beardow |

FOREIGN PATENT DOCUMENTS

| CN | 1574956 A | 2/2005 |
| CN | 1625892 A | 6/2005 |
| CN | 101146204 A | 3/2008 |

OTHER PUBLICATIONS

English translation of the Written Opinion from the International Searching Authority regarding International Application No. PCT/CN/2011/070226, dated Apr. 21, 2011.
International Search Report for International Patent Application No. PCT/CN2011/070226, dated Apr. 21, 2011, and English translation thereof.
* cited by examiner

*Primary Examiner* — Melur Ramakrishnaiah
(74) *Attorney, Agent, or Firm* — Harness, Dickey & Pierce, P.L.C.

(57) ABSTRACT

A method for switching video resolution includes: confirming that a video sender and a video receiver have established a video communication connection, and obtaining an initial resolution of the video sender; confirming that bandwidth of the video communication connection and hardware of the video sender meet preset conditions, and switching the initial resolution of the video sender to a target resolution, in which the target resolution is higher than the initial resolution. After establishing video communication connections between terminals, when there are available bandwidth and hardware of the terminal using video communication, the resolution of terminal may be switched to provide a more clear video communication for terminal user, and guarantee smooth switching of resolution.

5 Claims, 3 Drawing Sheets

METHOD, DEVICE, TERMINAL AND SYSTEM FOR SWITCHING VIDEO RESOLUTION

CROSS-REFERENCE TO RELATED APPLICATIONS

This application is a continuation of International Patent Application No. PCT/CN2011/070226 filed on Jan. 13, 2011. This application claims the benefit and priority of Chinese Patent Application No. 201010001654.8, filed Jan. 21, 2010. The entire disclosures of each of the above applications are incorporated herein by reference.

FIELD

The present disclosure relates to communication technologies, and to a method, device, terminal and system for switching video resolution.

BACKGROUND

This section provides background information related to the present disclosure which is not necessarily prior art.

With the development of network technology, network video communication has been used more and more widely. In network video communication, both of the video sides establish a network connection, then one or two sides with a camera may start the camera to capture a video stream, and send the captured video stream to the other side by the established network connection. The peer side which receives video stream presents the video to a user.

Currently, most users' network environment is not ideal. The bandwidth of the network connection is smaller, which may only support videos with 320×240 resolution. However, some users' network environment may support higher-resolution videos, such as 640×480 resolution. However, most of the video streams captured by the camera correspond to videos with 320×240 resolution, which may not provide sufficiently clear videos for users who support higher-resolution.

SUMMARY

This section provides a general summary of the disclosure, and is not a comprehensive disclosure of its full scope or all of its features.

The embodiments provide a method, a device, a terminal and a system for switching video resolution, so as to realize resolution switching in a video communication.

An embodiment provides a method for switching video resolution, including:

confirming that a video sender and a video receiver have established a video communication connection, and obtaining an initial resolution of the video sender;

confirming that bandwidth of the video communication connection and hardware of the video sender meet preset conditions, and switching the initial resolution of the video sender to a target resolution; wherein the target resolution is higher than the initial resolution.

Correspondingly, an embodiment provides a device for switching video resolution, including an obtaining unit and a switching unit, wherein the obtaining unit is to confirm that a video sender and a video receiver have established a video communication connection, and obtain an initial resolution of the video sender; and the switching unit is to confirm that bandwidth of the video communication connection and hardware of the video sender meet preset conditions, and switch the initial resolution of the video sender to a target resolution; wherein the target resolution is higher than the initial resolution.

An embodiment also provides a terminal, which includes the device for switching video resolution mentioned above.

Based on the above-mentioned technical solutions provided by various embodiments, it can be seen that, after establishing video communication connections between terminals, when there are available bandwidth and hardware of the terminal using video communication, resolution of the terminal may be switched to provide more clear videos for terminal user, and guarantee the smooth switching of resolution.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

To explain the technical solution provided by various embodiments more clearly, the drawings used by the descriptions of the embodiments will be introduced briefly as follows. Obviously, the drawings described below are a plurality of embodiments; one skilled in the art may further obtain other drawings according to these drawings on the premise of having no creative works.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Currently, most of the video streams captured by the camera correspond to videos with 320×240 resolution, which leads to the video display not being sufficiently clear. Various embodiments provide a method for switching video resolution, e.g., switching the video resolution from 320×240 to 640×480, to provide more clear video communication for user who supports higher-resolution.

Figure 1:
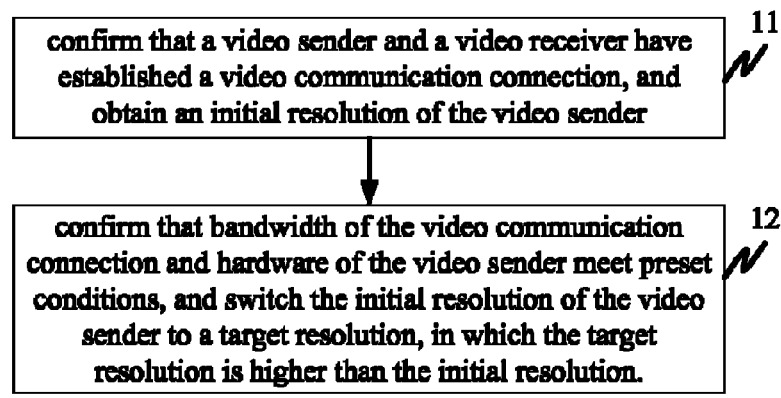
FIG. 1 is a flow chart illustrating a method for switching video resolution, in accordance with an embodiment.

FIG. 1 is a flow chart illustrating a method for switching video resolution provided in various embodiments. As shown in FIG. 1, the switching method includes:

11: confirming that a video sender and a video receiver have established a video communication connection, and obtaining an initial resolution of the video sender;

12: confirming that the bandwidth of the video communication connection and hardware of the video sender meet preset conditions, and switching the initial resolution of the video sender to a target resolution, wherein the target resolution is higher than the initial resolution.

Blocks 11 and 12 may be performed by a sending terminal or a switching device.

Based on the above-mentioned technical approach provided by the various embodiments, when bandwidth between the video communication connection and hardware of the terminal is available, the resolution of the terminal may be switched. In various embodiments, the initial resolution of video sender is lower than the target resolution. For example, after establishing video communication connection between a video sender and a video receiver, the initial resolution of the video sender is 320×240 resolution, and the target resolution is assumed to be 640×480 resolution. Compared with the initial resolution of 320*240 resolution, the target resolution of 640×480 may provide clearer video communication for the terminal user.

Specifically, confirming that the bandwidth of the video communication connection and hardware of the video sender meet preset conditions, block 12 may include:

confirming that the bandwidth of the video communication connection is greater than or equal to a preset value of bandwidth, wherein the preset value of bandwidth is set according to the size of the target resolution; and confirming that Central Processing Unit (CPU) dominant frequency of the video sender is greater than or equal to a preset value of the dominant frequency, wherein the preset value of dominant frequency is set according to the size of the target resolution.

Optionally, whether the bandwidth of the video communication connection is greater than or equal to the preset value of the bandwidth is confirmed first. After that, whether the CPU dominant frequency of the video sender is greater than or equal to the preset value of dominant frequency is confirmed. However, the specific sequence for performing the confirmation is unrestricted.

Because the target resolution is greater than the resolution of video sender, after establishing the video communication connection between the video sender and video receiver, e.g., the video stream with 640×480 resolution is equivalent to more than three times of the video stream with 320×240 resolution. Thus, in order to enable a video sender to transfer video data to a video receiver, the bandwidth of the video communication connection needs to be greater than or equal to the preset value of bandwidth.

Furthermore, because the video sender transfers a video stream with 640×480 resolution, CPU consumption of the video sender is increased. It is necessary to judge whether the CPU dominant frequency is able to withstand such a large consumption, e.g., judging whether the CPU dominant frequency of the video sender is greater than or equal to the preset value of dominant frequency.

Specifically, confirming that bandwidth of the video communication connection and hardware of the video sender meet preset conditions in block 12 may further include:

confirming that frame rate and corresponding network packet loss rate of the video sender with the initial resolution meet the preset conditions, e.g., confirming whether the frame rate of the initial resolution meets the preset value of frame rate and whether the corresponding network packet loss rate is smaller than or equal to the preset value of the network packet loss rate.

As in actual network applications, network bandwidth does not necessarily represent the network's available bandwidth. Thus, by increasing the frame rate of the initial resolution, to enable it to be equivalent to the required bandwidth needed by the frame rate of the target resolution, confirming whether the frame rate of the initial resolution meets the preset value of frame rate, and whether the corresponding network packet loss rate is smaller than or equal to the preset value of the network packet loss rate. When confirming that the frame rate of the initial resolution meets the preset value of frame rate and the corresponding network packet loss rate is smaller than or equal to the preset value of the network packet loss rate, it may be considered that the network bandwidth meets the requirements, then the initial resolution of video sender to the target resolution is switched.

For example, for video data, video bandwidth=video resolution×video frame rate. Thus, increasing high frame rate of 320×240 resolution, enables it to be equivalent to the required video bandwidth needed by a low frame rate of 640×480 resolution. Moreover, when there is no available video bandwidth, video data packets will be lost, and network packet loss may be detected when increasing the frame rate of 320×240 resolution. When the frame rate of 320×240 resolution is greater than or equal to the preset value of frame rate, and the corresponding network packet loss rate is smaller than or equal to the preset value of network packet loss rate, the video bandwidth meets the frame rate of 640×480 resolution.

It should be noted that, after a video sender and a video receiver establish a video communication connection, the video sender may activate a camera to capture video streams and send the video streams to the video receiver. The resolution of video streams captured at this moment is an initial resolution, code, and output the video streams. Similarly, the resolution of outputted video streams is also the initial resolution, which is not repeated here.

It can be seen that the method for switching video resolution provided by the various embodiments, may switch a video sender's initial resolution to a target resolution, so as to switch a video sender's output resolution to the target resolution, and provide more clear video communication for terminal user.

In the method for switching video resolution provided by the various embodiments, after block 11 in which a video sender and a video receiver establish a video communication connection, and the video sender outputs video streams, block 12 is performed simultaneously. Block 12 confirms that bandwidth of the video communication connection and hardware of the video sender meet the preset conditions, and switches the video sender's resolution to a target resolution. Thus, in the process of switching the video sender's resolution to the target resolution, user's video communication is transitioned smoothly, which avoids video communication interruption or video communication quality decline resulting from no available bandwidth or hardware when switching to target resolution.

In various embodiments, the method for switching video resolution may include: after block 11 in which a video sender and a video receiver establish a video communication connection, waiting for the finish, confirming that bandwidth of the video communication connection and hardware of the video sender meet the preset conditions, the video sender outputs video of target resolution to the video receiver. Although there may be certain waiting time, as the waiting time is shorter, the impact on user's experience of performing video communication is also smaller.

In the method for switching video resolution provided by the various embodiments, a video sender may be understood as a video sender device. Similarly, a video receiver may be understood as a video receiver device.

For the two sides of video communication, the video receiver corresponding to the video sender may be treated as a video sender, which is also applicable to the method for switching video resolution provided by the embodiment. Thus, by adopting the method for switching video resolution provided by the embodiment, both sides of the video communication may realize the switch of video resolution, and provide more clear video communication for terminal user.

Figure 2:
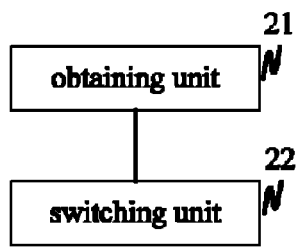
FIG. 2 is a schematic diagram illustrating structure of a device for switching video resolution, in accordance with an embodiment.

In various embodiments, as shown in FIG. 2, a device for switching video resolution, includes:

an obtaining unit 21, which confirms that a video sender and a video receiver have established a video communication connection, and obtains an initial video resolution of the video sender;

a switching unit 22, which confirms that bandwidth of the video communication connection and hardware of the video sender meet preset conditions, and switches the initial resolution of the video sender to a target resolution, wherein the target resolution is higher than the initial resolution.

Based on the above-mentioned technical solution provided by the various embodiments, after establishing video communication connections between terminals, when there is available bandwidth and hardware of the terminal using video communication, the resolution of terminal may be switched to provide clearer videos for terminal user, and guarantee the smooth switching of resolution.

Figure 3:
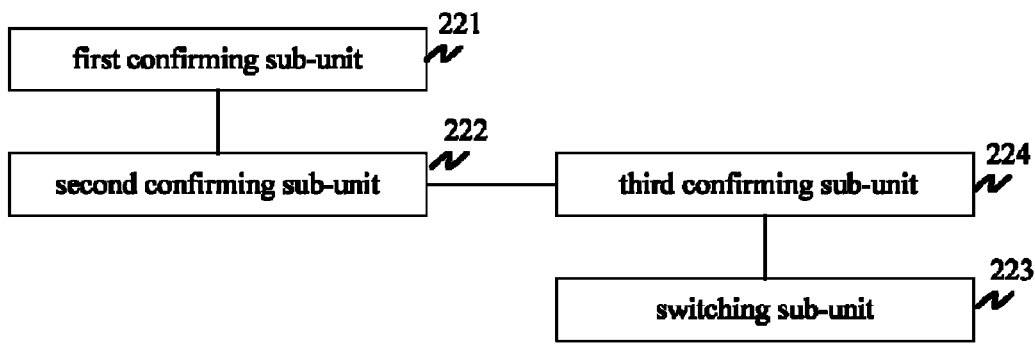
FIG. 3 is a schematic diagram illustrating structure of a device for switching video resolution, in accordance with another embodiment.

As shown in FIG. 3, the switching unit 22 may include:

a first confirming sub-unit 221, which confirms that the bandwidth of the video communication connection is greater than or equal to a preset value of bandwidth.

a second confirming sub-unit 222, which confirms that the CPU dominant frequency of the video sender is greater than or equal to a preset value of dominant frequency;

a switching sub-unit 223, which switches the initial resolution of the video sender to the target resolution, according to confirming results of the first confirming sub-unit 221 and the second confirming sub-unit 222.

The switching unit 22 may further include:

a third confirming sub-unit 224, which confirms that frame rate of the video sender with the initial resolution meets a preset value of frame rate and corresponding network packet loss rate is smaller than or equal to a preset value of the network packet loss rate.

Furthermore, the switching unit 22 may further include:

an analyzing sub-unit, which increases the frame rate of the initial resolution, to enable it to be equivalent to the required bandwidth needed by the frame rate of target resolution. The third confirming sub-unit 224 confirms whether the increased frame rate of the initial resolution meets the preset value of the frame rate, and whether the corresponding network packet loss rate is smaller than or equal to the preset value of the network packet loss rate. Here, as video bandwidth=video resolution×video frame rate, the preset value of the frame rate may be: the bandwidth needed by the frame rate of the target resolution/the initial resolution. For initial resolution, increasing the frame rate is equivalent to increasing the bandwidth. Thus, in the process of increasing the frame rate, when the increased frame rate meets the preset value of frame rate, and if the corresponding network packet loss rate of the increased frame rate is smaller than or equal to the preset value of network packet loss rate, then the current network bandwidth meets the bandwidth requirements of the target resolution.

The device for switching video resolution provided by the various embodiments and components, may be understood by referring to the method for switching video resolution provided by the above-mentioned embodiments, which is not repeated here.

Figure 4:
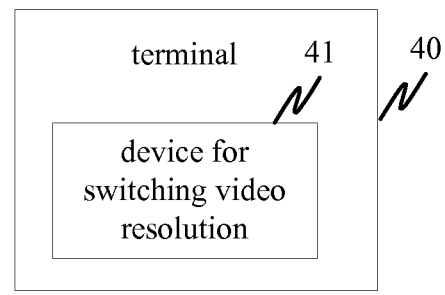
FIG. 4 is a schematic diagram illustrating structure of a terminal, in accordance with an embodiment.

In various embodiments, as shown in FIG. 4, based on the device for switching video resolution provided by the above-mentioned embodiments, an embodiment further provides a terminal 40 includes the switching device 41 for switching video resolution provided by the above-mentioned embodiments.

The switching device 41 of video resolution is set within the terminal 40, or connected to the outside of the terminal 40.

The switching device 41 of video resolution confirms that bandwidth of the video communication connection and hardware of the terminal 40 meet preset conditions. After confirming that the terminal 40 establishes a video communication connection with other terminal, switch device 41 then switches the initial resolution of the terminal 40 to a target resolution, wherein the target resolution is higher than the initial resolution.

Based on the above-mentioned technical solution provided by the various embodiments, after establishing video communication connections between terminals, when bandwidth and hardware of the terminal using video communication are available, the resolution of terminal may be switched to provide clearer videos for terminal user, and guarantee the smooth switching of resolution.

Figure 5:
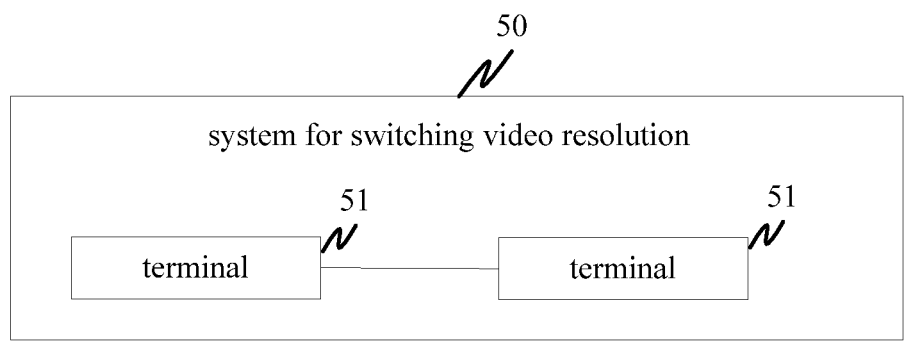
FIG. 5 is a schematic diagram illustrating a system for switching video resolution, in accordance with an embodiment.

In various embodiments, as shown in FIG. 5, based on the device for switching video resolution provided by the above-mentioned embodiment, various embodiments further provide a switching system 50 which includes at least two terminals 51 provided by the above-mentioned embodiment.

Taking the switching system 50 of video resolution including two terminals 51 as an example, the two terminals 51 are both sides of the video communication, such as video sender and video receiver.

After establishing video communication connection, two terminals 51 respectively confirm that bandwidth of video communication connection and hardware meet the preset conditions, and then switch each resolution to the target resolution.

Based on the above-mentioned various embodiments, it can be seen that, after establishing video communication connections between terminals, when bandwidth and hardware of the terminal using video communication are available, the resolution of terminal may be switched to provide clearer videos for terminal user, and guarantee the smooth switching of resolution.

Figure 6:
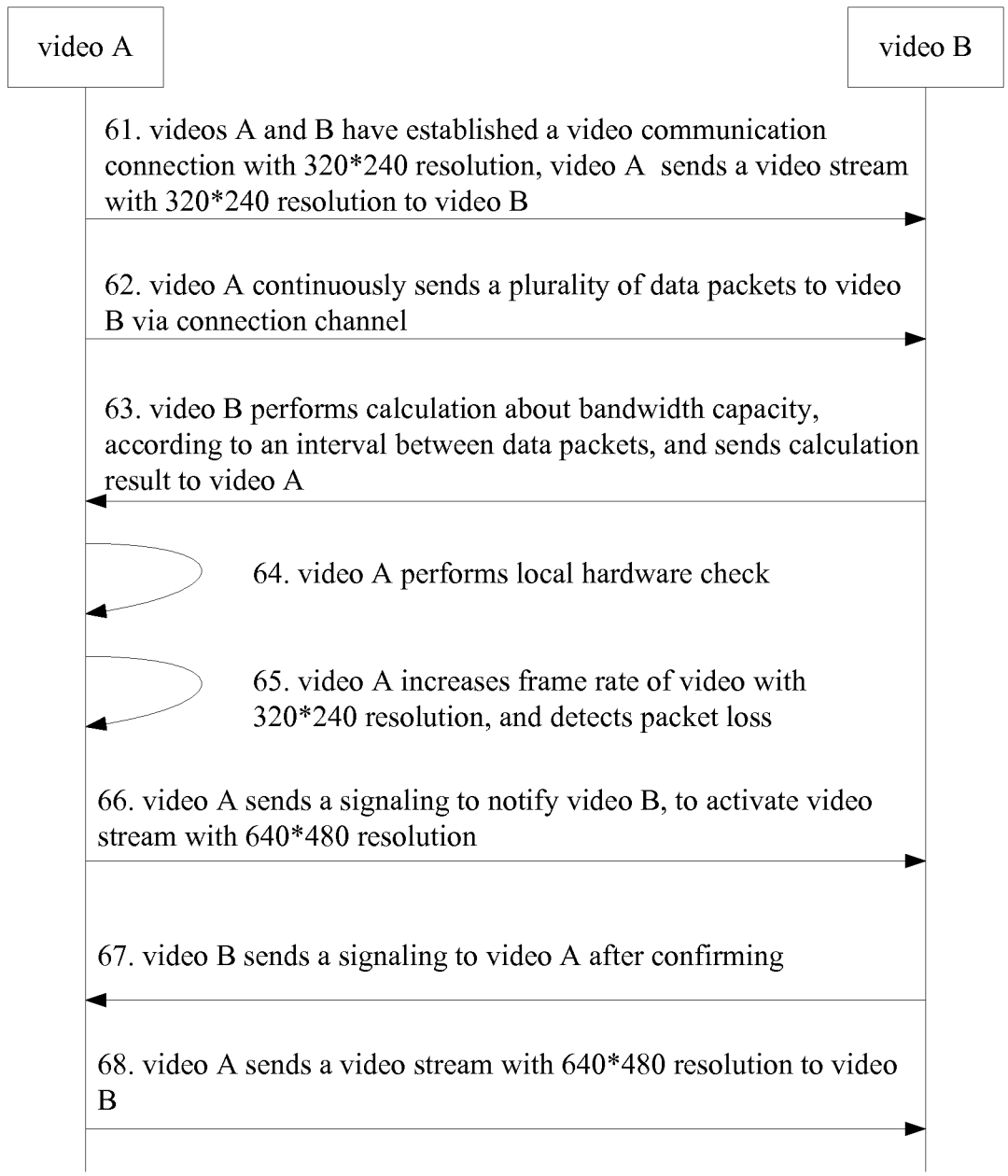
FIG. 6 is an application flow chart illustrating a method for switching video resolution, in accordance with an embodiment.

As shown in FIG. 6, an application flow chart illustrating a method for switching video resolution in accordance with an embodiment, explaining the switching method in which video A is switched from 320×240 resolution to 640×480 resolution. In FIG. 6, video A is equivalent to client A of the video communication, video B is equivalent to client B of the video communication. The method includes:

61. videos A and B have established a video communication connection with 320×240 resolution, video A activates a camera to capture a video stream with 320×240 resolution, and sends the video stream with 320×240 resolution to the video B.

The specific realization of videos A and B establishing a video communication connection, as well as the camera capturing and sending video stream is the prior art, is not repeated here.

62. video A continuously sends a plurality of data packets to video B via a connection channel.

For example, video A continuously sends four data packets to video B via a connection channel.

63. video B receives a plurality of data packets, performs bandwidth calculation according to intervals between data packets, and sends the calculating result to video A.

For example, video B receives four data packets from video A, and calculates whether the bandwidth is greater than or equal to 60 KB according to relationship between the number of data packets and bandwidth, and then proceeds with block 64, otherwise the procedure is ended.

The above-mentioned blocks 62, 63 complete the measurement of bandwidth, the specific realization of which is the prior art and is not repeated here. The measurement of bandwidth is not limited to such realization of blocks 62, 63; other approaches for measuring bandwidth may also be applicable.

64. video A judges whether its CPU dominant frequency is greater than or equal to a preset value of dominant frequency.

In this block, as the target resolution is 640×480, and consumption of the terminal's CPU is great, it is necessary to judge whether the CPU dominant frequency is able to withstand such a great consumption. If the CPU dominant frequency is greater than or equal to dual core dominant frequency 2.0 GHz, then proceed with block 65, otherwise end the procedure.

Block 64 may be understood as local hardware check. The local hardware check is not limited to judging CPU dominant frequency in block 64, and may adopt other approaches.

65. video A detects packet loss simultaneously when increasing the frame rate of video with 320×240 resolution.

Increasing frame rate of 320×240 resolution, enables it to be equivalent to the bandwidth needed by frame rate of 640×480 resolution. If the frame rate of 320×240 resolution is greater than or equal to 20 frames, and the corresponding network packet loss rate is smaller than or equal to 3%, then the bandwidth meets the frame rate of the video with 640×480 resolution, and proceed with block 66, otherwise end the procedure.

66. video A sends a signaling to notify video B to activate video with 640×480 resolution.

For example, video A sends Video Graphic Array (VGA) video availability information to video B, to notify video B to activate video with 640×480 resolution.

67. video B receives the notification signaling from video A, after confirming that accepting video with 640×480 resolution, send a confirming signal to video A.

For example, video B sends a confirming signaling to trigger video A to activate VGA video requirement.

68. video A receives the confirming signaling of video B, activates camera to capture video stream with 640×480 resolution, and sends video stream with 640*480 resolution to video B.

For example, video A outputs VGA video stream with 640×480 resolution.

In the above-mentioned blocks 61-68, the process of switching video resolution from 320×240 to 640×480 is completed.

For video B, it is also able to realize the process of switching video resolution from 320×240 to 640×480, which is similar with the above-mentioned blocks 62-68 and are not repeated here.

Based on the above-mentioned technical solution provided by the embodiment, it can be seen that, after establishing video communication connections between terminals, when bandwidth and hardware of the terminal using video communication are available, the resolution of terminal may be switched to provide clearer video communication for terminal user, and guarantee the smooth switching of resolution.

It should be noted that in order to be described simply, the aforementioned embodiments are expressed as combination of a series of actions. However, to one skilled in the art, the present invention is not limited to the described sequence of actions, as some blocks may be executed in other sequence or performed simultaneously. Further, one skilled in the art may learn that the embodiments described in the specification all belong to preferred embodiments, and the actions and modules involved may not be necessary.

In the above-mentioned embodiments, the description of each embodiment has respective emphasis, some parts, which are not described in detail in an embodiment, may refer to corresponding descriptions in other embodiments.

One skilled in the art may understand that, all or part of the processes in the methods of above-mentioned embodiments may be completed via related hardware instructed by the computer program. The program may be stored in a computer readable storage medium. When executing the program, the processes of above-mentioned method embodiments may be included. The storage medium may be disk, Compact Disc (CD), Read-Only Memory (ROM) or Random Access Memory (RAM), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for switching video resolution, comprising:
confirming that a video sender and a video receiver have established a video communication connection, and obtaining an initial video resolution of the video sender;
confirming that bandwidth of the video communication connection and hardware of the video sender meet preset conditions, and switching the initial resolution of the video sender to a target resolution; wherein the target resolution is higher than the initial resolution;
wherein confirming that the bandwidth of the video communication connection and the hardware of the video sender meet the preset conditions, comprises:
confirming that the bandwidth of the video communication connection is greater than or equal to a preset value of bandwidth;
confirming that a Central Processing Unit (CPU) dominant frequency of the video sender is greater than or equal to a preset value of dominant frequency;

wherein confirming that the bandwidth of the video communication connection and the hardware of the video sender meet the preset conditions, further comprises:

confirming that frame rate of the video sender with the initial resolution meets a preset value of the frame rate, and corresponding network packet loss rate is smaller than or equal to a preset value of the network packet loss rate.

2. The method according to claim 1, wherein confirming that the frame rate of the video sender with the initial resolution meets the preset value of the frame rate, and the corresponding network packet loss rate is smaller than or equal to the preset value of the network packet loss rate, comprises:

increasing the frame rate of the initial resolution, confirming that the increased frame rate meets the preset value of frame rate, and confirming that the corresponding network packet loss rate of the increased frame rate is smaller than or equal to the preset value of the network packet loss rate.

3. A device for switching video resolution, comprising an obtaining unit and a switching unit, wherein the obtaining unit is to confirm that a video sender and a video receiver have established a video communication connection, and obtain an initial video resolution of the video sender; and the switching unit is to confirm that bandwidth of the video communication connection and hardware of the video sender meet preset conditions, and switch the initial resolution of the video sender to a target resolution; wherein the target resolution is higher than the initial resolution;

wherein the switching unit comprises a first confirming sub-unit, a second confirming sub-unit and a switching sub-unit, the first confirming sub-unit is to confirm that the bandwidth of the video communication connection is greater than or equal to a preset value of bandwidth;

the second confirming sub-unit is to confirm that a Central Processing Unit (CPU) dominant frequency of the video sender is greater than or equal to a preset value of dominant frequency; and the switching sub-unit is to switch the initial resolution of the video sender to the target resolution, according to confirming results of the first confirming sub-unit and the second confirming sub-unit;

wherein the switching unit further comprises:

a third confirming sub-unit, which is to confirm that frame rate of the video sender with the initial resolution meets a preset value of frame rate and corresponding network packet loss rate is smaller than or equal to a preset value of the network packet loss rate.

4. The device according to claim 1, wherein the switching unit further comprises:

an analyzing sub-unit, which is to increase the frame rate of the initial resolution, the third confirming sub-unit is to confirm that the increased frame rate is greater than or equal to the preset value of the frame rate, and the corresponding network packet loss rate is smaller than or equal to the preset value of the network packet loss rate.

5. A terminal, comprising the device for switching video resolution claimed in claim 3, which is to implement video communications among multiple terminals.

* * * * *